United States Patent [19]

Julen et al.

[11] Patent Number: 5,599,131
[45] Date of Patent: Feb. 4, 1997

[54] PLATE FASTENER WITH BOLTS PREASSEMBLED

[75] Inventors: Donald L. Julen, Bolingbrook; Peter M. Ramsey, Glen Ellyn; David F. Drabek, Plainfield; John H. Winkelman, Naperville, all of Ill.

[73] Assignee: Flexible Steel Lacing Company, Downers Grove, Ill.

[21] Appl. No.: 354,588

[22] Filed: Dec. 13, 1994

Related U.S. Application Data

[63] Continuation-in-part of Ser. No. 247,567, May 23, 1994, abandoned.

[51] Int. Cl.$^6$ .................................................. F16B 35/00
[52] U.S. Cl. .......................... 403/342; 403/388; 411/512; 411/533
[58] Field of Search ............................... 403/312, 388; 411/533, 526, 512

[56] References Cited

U.S. PATENT DOCUMENTS

| | | | |
|---|---|---|---|
| 913,024 | 2/1909 | Meacham | 411/526 X |
| 1,854,800 | 4/1932 | Lowenfeld | 411/512 X |
| 1,862,275 | 6/1932 | Menut | 411/526 X |
| 2,200,702 | 5/1940 | Oddie | 411/533 X |
| 2,312,379 | 3/1943 | Bechik | 411/526 X |
| 2,439,516 | 4/1948 | Holcomb | 411/533 X |
| 2,506,953 | 5/1950 | Dzus | 411/533 X |
| 2,613,964 | 10/1952 | Hocher | 403/312 |
| 3,367,228 | 2/1968 | King, Jr. | 411/526 X |
| 3,386,771 | 6/1968 | Verdier et al. | 411/533 X |
| 3,392,728 | 7/1968 | Bone et al. | 411/533 X |
| 3,869,219 | 3/1975 | Wilson et al. | 403/388 X |
| 3,892,031 | 7/1975 | Bisbing | 411/533 X |
| 4,181,447 | 1/1980 | Romain | 403/312 X |
| 4,235,560 | 11/1980 | Schimmel | 403/388 |
| 4,427,318 | 1/1984 | Kaminski | 403/388 X |
| 4,533,277 | 8/1985 | Alexander et al. | 403/312 X |
| 4,659,246 | 4/1987 | Sugiyama | 403/388 X |
| 4,749,322 | 6/1988 | Sygnator | 411/533 X |
| 4,844,677 | 7/1989 | Schwartzman | 411/512 |
| 5,161,357 | 11/1992 | Braunberger et al. | 403/312 X |
| 5,256,020 | 10/1993 | Ikeda et al. | 411/533 X |
| 5,423,647 | 6/1995 | Suzuki | 411/526 X |

FOREIGN PATENT DOCUMENTS

| | | | |
|---|---|---|---|
| 6600420 | 11/1987 | Brazil . | |
| 434460 | 4/1948 | Italy | 403/312 |
| 2066918 | 7/1981 | United Kingdom | 411/526 |
| 2226862 | 7/1990 | United Kingdom | 411/512 |

*Primary Examiner*—Terry Lee Melius
*Assistant Examiner*—Christopher Novosad
*Attorney, Agent, or Firm*—Fitch, Even, Tabin & Flannery

[57] ABSTRACT

A belt fastener having an upper plate and a lower plate with holes which align with holes in a pair of belt ends, and bolts are inserted through the aligned holes of the plates and the belt ends, and nuts screwed onto the bolts, to connect the belt ends. A preassembled lower plate and bolt combination is provided in which bolts are retained in their respective lower plate apertures by washers disposed on the bolt shanks. The washers are disposed on the bolt shanks sufficiently close to the lower plate to maintain anti-rotational engagement of the bolts with the lower plate, and spaced sufficiently far from the lower plate to allow outward swinging of the bolts to an insertion position for insertion of the bolts through the belt holes in an outwardly swung position for subsequent drawing together of the bolt and belt ends. The washers are displaceable along their shanks into abutment with the lower plate and deformable under the pressure associated with clamping together of the plates about the belt ends, whereby the washers deform and fill in the spaces between the bolts and the lower plate. The washers are preferably formed with flexible resilient tabs about a central aperture, with the tabs being deflected by the bolt shanks when slid onto their shanks to prevent washer material from being scraped off the washer and into the threads of the bolt when the washer is initially applied to the bolt.

2 Claims, 6 Drawing Sheets

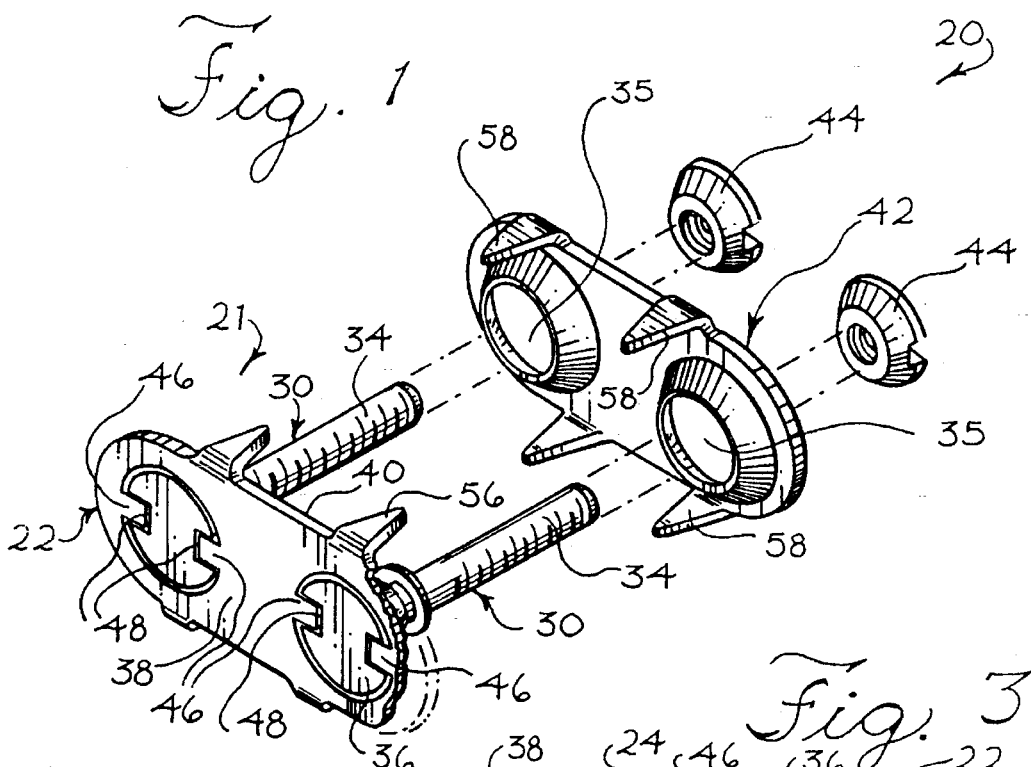
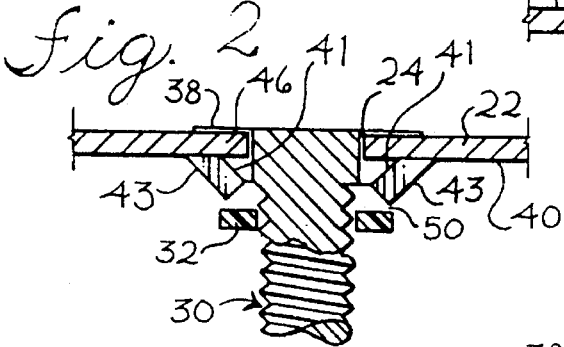
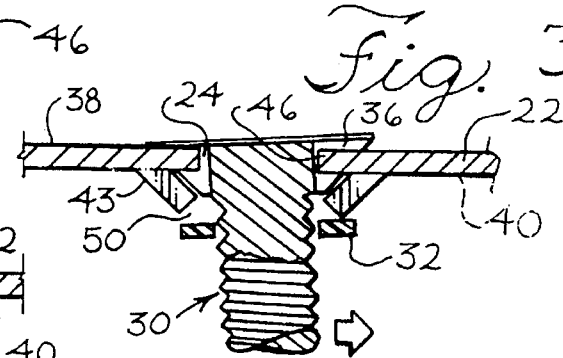
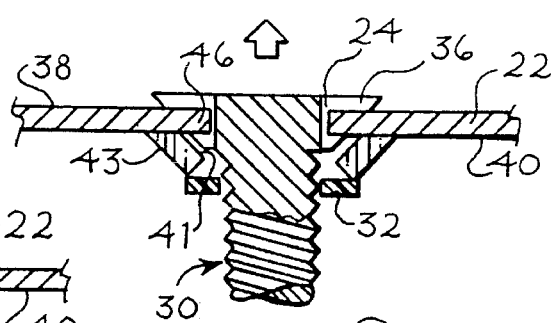

ple # 5,599,131

PLATE FASTENER WITH BOLTS PREASSEMBLED

RELATION TO OTHER APPLICATIONS

This application is a continuation-in-part of U.S. patent application Ser. No. 08/247,567 of same title filed on May 23, 1994, now abandoned, which is hereby incorporated by reference.

FIELD OF THE INVENTION

The present invention pertains to belt fasteners for connecting together ends of a belt, and more particularly pertains to plate-type belt fasteners in which the plates span the belt ends.

BACKGROUND OF THE INVENTION

Plate-type belt fasteners for connecting together a pair of belt ends are well known. Plate-type belt fasteners typically comprise upper and lower plates which are positioned adjacent the upper and lower surfaces of the belt ends to be connected, with both the upper and lower plates spanning the pair of belt ends. Both the upper and lower plates have holes which align with holes formed in the belt ends. Bolts are passed through the aligned holes of the lower plate, belt, and upper plate of both belt ends, and nuts screwed onto the shank of the bolt projecting through the upper plate to clamp the upper and lower plates tightly about the belt ends. Typically, a plurality of such belt fasteners, each spanning the pair of belt ends to be connected, are provided along the width of the belt ends to maintain interconnection of the belt ends across their width.

It is known to provide a preassembled combination of a lower plate and fastening bolts to preclude the necessity of having to assembly these parts prior to Inserting the bolts in the belt ends when making a splice. The preassembly of the lower plate and bolts speeds the job of belt splicing. The bolts have integral bolt heads and are maintained in their respective lower plate apertures by washers secured to the bolts on the opposite side of the lower plate from the bolt heads.

Heretofore, the bolts were held in fixed positions on the lower plate by steel spring clips that held the bolts at a predetermined orientation in which a pair of grooves in the bolt head were aligned with and received a pair of projections from the lower plate. The interlocked projections and grooves held the bolt from turning when the nuts were tightened on the bolts. The spring clips were removed and discarded. Sometimes, through inadvertence or carelessness the spring clips were allowed to litter a floor of a mine or other facility having a conveyor and the spring clips could eventually get into a conveyor. The spring clips were relatively expensive and were usually provided only for large orders of plate belt fasteners. The spring clips were manually applied to the bolt shanks thereby adding to the cost of this preassembled belt plate fasteners.

A Brazilian company, ONCA Ind. Metalurgicas S.A. had supplied plastic washers rather than spring steel clips to hold the bolts in oriented positions, and had filed thereon a Brazilian application BR 6600420, which is now abandoned.

SUMMARY OF THE INVENTION

In accordance with the present invention, the bolts may be swung outwardly relative to the lower plate to an insertion position, while still maintaining anti-rotational engagement between the bolt heads and the lower plate. To provide the ability of the bolts to swing outwardly, from positions perpendicular to the bottom plate, the washers are disposed on the bolts in spaced relation from the lower plate. Thereby, the washers prevent the bolts falling out of their respective lower plate apertures, while still allowing the bolts to be swung outwardly for insertion of the bolts into the belt holes in their outwardly swung insertion position.

In accordance with another aspect of the present invention, the washers are secured to the bolt shanks sufficiently close to the lower plate that the bolts are prevented from raising up an amount which would cause disengagement of the anti-rotational engagement of the bolt heads with the lower plate. If the gap between the washers and the lower plate is too great, the bolts could slide within their respective apertures to disengage the bolt heads from the anti-rotation projections on the bottom plate.

Hence, the washers are disposed on the bolts at a location which is sufficiently spaced from the lower plate that the washers do not interfere with outward swinging of the bolts to their outwardly angled insertion position, and yet which is also sufficiently close to the lower plate that the washers prevent the bolts from sliding out of their anti-rotational engagement with the lower plate.

In accordance with a still further aspect of the present invention, the washers are plastic and are retained on their respective bolt shanks by tolerance fit and the plastic is extrudable and flows under pressure when tightening the nuts on the bolts. When the upper and lower plates are clamped tightly about belt ends, the plastic washers slide along the bolts, under the influence of the clamping force, into abutment with the lower surface of the lower plate. The deformability of the plastic washers under the pressure associated with clamping together the upper and lower plates about the belt ends, allows the washers to flow to fill the spaces between the bolt heads and the lower plate. Thus, the deformed plastic washers extrude under pressure to fill the spaces and prevent sifting of particulate or water through the spaces between the bolts and the lower plate.

The preferred plastic used for the washers is a non-brittle plastic that is inexpensive and which operates over a good temperature range.

In order to prevent some of the plastic material of the washer from being scraped off the washer by the threads of the bolt shank when the washer is initially applied to the bolt shank, which may result in some of the plastic of the washer being lodged into the threads of the bolt which may lead to subsequent interference with proper screwing of the nuts onto the bolt to clamp the plates about the belt, a washer having resiliently deflectable tabs is preferably employed. The washer preferably has an annular ring portion defining a central aperture with a plurality of integral tabs extending radially inwardly from the annular ring portion into the central aperture. The tabs are resiliently deflected by the bolt shank as it is inserted through the central aperture to prevent the threaded shank of the bolt from scraping plastic from the washer during its initial engagement. The tabs of the washer engage with the threads of the bolt shank to maintain the washer at a desired position along the bolt shank.

BRIEF DESCRIPTION OF THE DRAWINGS

In the drawings, wherein like elements are referenced alike:

FIG. 1 is an exploded view of a belt fastener embodying various features of the present invention, with a preassembled lower plate and bolt combination, shown on the left side of the drawing, having the lower plate cut away to show the gap between the washer and the lower plate;

FIG. 2 is an enlarged, partial sectional view of the preassembled lower plate and bolt combination of FIG. 1, illustrating the gap between the washers and the lower plate;

FIG. 3 is an enlarged, partial sectional view of the preassembled lower plate and bolt combination of FIG. 1, illustrating a bolt swung outwardly until abutment of one side of the washer with the lower plate;

FIG. 4 is an enlarged, partial sectional view of the preassembled lower plate and bolt combination of FIG. 1, illustrating the deformed washer filling in the spaces between the bolt and the lower plate following clamping together of the upper and lower plates about the belt ends;

FIG. 5 is an enlarged, partial sectional view of the preassembled lower plate and bolt combination of FIG. 1, illustrating the abutment of the washers against the lower plate to maintain engagement of the anti-rotational means upon raising of the bolts;

DETAILED DESCRIPTION OF THE PREFERRED EMBODIMENTS

Figure 6:
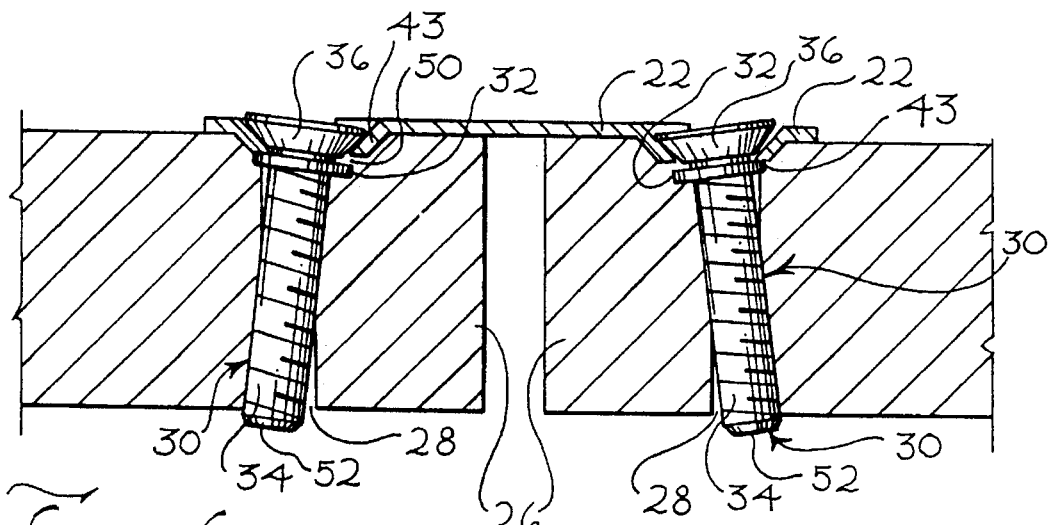
FIG. 6 is an enlarged, sectional view of the preassembled lower plate and bolt combination, shown with the bolts swung outwardly to their insertion position during insertion of the bolts into the belt holes, and a gap between the belt ends.

A belt fastener embodying various features of the present invention is illustrated in FIG. 1 and referred to generally by reference numeral 20. A preassembled combination of elements is referenced generally by numeral 21, and referred to herein as a preassembled lower plate and bolt combination. The belt fastener comprises a generally flat lower plate 22 having a pair of apertures 24 each registrable with a respective hole 28 in the belt ends 26 to be connected (see FIG. 5).

A pair of bolts 30, or other suitable fasteners, are disposed within respective apertures 24 in the lower plate 22. The bolts have respective washers 32 disposed on their shank portions 34 on the side of the lower plate 22 opposite the bolt heads 36 to maintain the bolts 30 in engagement with the lower plate 22 and within their respective lower plate apertures 24. That is, the heads 36 of the bolts 30 are disposed on the lower side 38 of the lower plate 22, and the washers 32 are secured to the shanks 34 of the bolts 30 on the upper side 40 of the lower plate 22, to prevent the bolts 30 from sliding out of their respective apertures 24. Thereby, the lower plate 22, pair of bolts 30, and washers 32 constitute a preassembled combination of elements suitable for use with an upper plate 42 having a pair of apertures 35, and a pair of nuts 44 for drawing together and connecting a pair of belt ends 26 as described below.

Figure 7:
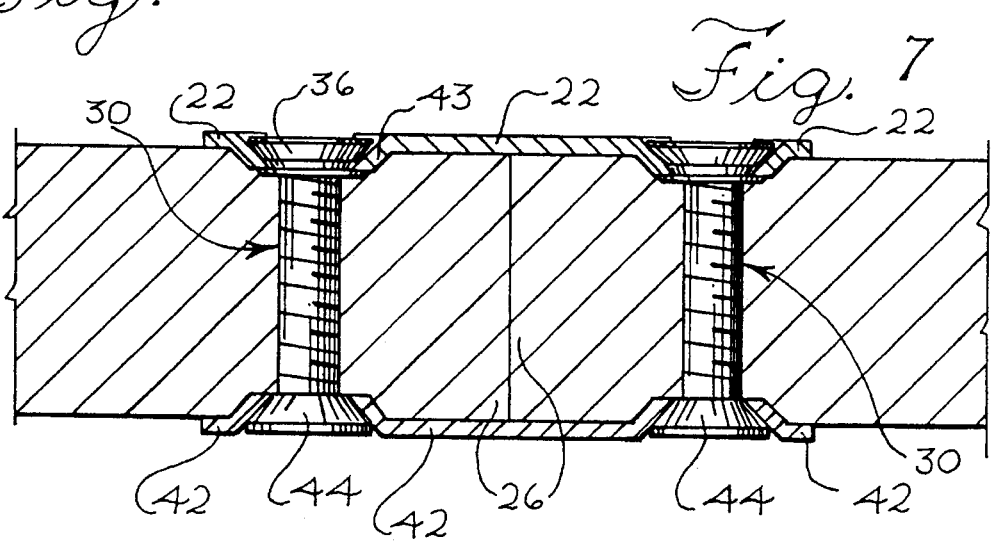
FIG. 7 is an enlarged, sectional view of the preassembled lower plate and bolt combination, shown with the bolts forced to their engaged position substantially parallel to one another and maintained in their engaged position by a lower plate and nuts, with the belt ends being moved into tight abutment with one another.

As best seen in FIGS. 6 and 7, the bolts 30 are swingable within their respective lower plate apertures 24 from the insertion position shown in FIG. 6 in which the bolts 30 are angled outwardly apart from one another, to the fastened position shown in FIG. 7 in which the bolts 30 extend substantially parallel to one another and substantially perpendicular to the lower plate 22.

It is important that the bolts 30 be allowed to swing outwardly to their insertion position of FIG. 6 during insertion of the bolts 30 through the belt apertures 24. This allows the belt ends 26 to be subsequently drawn tightly together upon straightening out of the bolts to their fastened position as shown in FIG. 7.

To maintain the ability of the bolts 30 to swing outwardly, the washers 32 are disposed on their respective bolt shanks 34 at a predetermined position therealong in spaced relation from the lower plate 22. The spacing between the washers 32 and the lower plate 22 in accordance with the present invention is preferably such that the washers do not significantly interfere with the swinging movement of the bolts 30 between their insertion and fastened positions. With the washers 32 so disposed, the washers 32 serve to maintain the bolts 30 within their respective lower plate apertures 24 while also allowing the desired swinging movement of the bolts 30.

The upper surface 40 of the lower plate 22 preferably defines a recess 39 at each of the apertures 24 by upwardly deflecting a pair of diametrically opposed arcuate portions of the lower plate 22 disposed about the apertures 24. The arcuate deflected portions define a pair of diametrically opposed channels 37 between the pair of diametrically opposed arcuate portions, as best seen in FIG. 10. In the illustrated embodiment, the upwardly deflected arcuate portions about the apertures 24 in the lower plate 22 define outer arcuate surfaces 43 on the upper side 40 of the lower plate 22 and form a semi-conical inner seating surface 41 for the bolt heads 36 (see FIG. 9). The pair of diametrically opposed, non-deflected portions define a pair projections 46 at each aperture 24 which extend into the recesses 39 of the lower plate 22. Hence, as seen in FIG. 10, the channels 37 are disposed directly above the projections 46.

The heads 36 of the bolts 30 are tapered on their underside to generally conform to the semi-conical seating surfaces 41 of the lower plate 22. The provision of the tapered bolt heads 36 residing against the respective semi-conical seating surfaces 41 of the lower plate 22 allows for easy outward swinging movement of the bolts 30 with respect to the lower plate 22. The tapered bolt heads 36 slide easily over their respective semi-conical seating surfaces 41 to facilitate easy swinging movement of the bolts. Also, the top of the heads 36 of the bolts 30 are preferably flat so that the tops of the bolts 30 are substantially flush with the lower surface 38 of the lower plate 22 when the bolt heads are disposed within their respective recesses 39. The bolt heads 36 also have notches or grooves 48 which receive respective projections 46 of the lower plate to provide anti-rotational engagement of the bolts 30 with the lower plate 22. That is, with the bolts 30 extending through the lower plate apertures 24 being rotated about their respective axes, the projections 46 of the lower plate 22 move into alignment with the grooves 48 of the respective bolt heads 36 to allow the bolt heads 36 to move into the respective recesses 39, as shown in FIG. 1. The anti-rotational engagement of the bolts 30 with the lower plate 22 eliminates the need for manually holding the bolt heads 36 while tightening the nuts 44 onto the bolt shanks 34. To assure that the anti-rotational engagement between the bolt heads 36 and the lower plate 22 is maintained, the washers 32 disposed on the bolt shanks 34 must be spaced sufficiently close to the lower plate 22 to prevent the bolt heads 36 from being raised above the projections 46 on the lower plate. While disposing the washers 32 on the bolts shanks 34 directly adjacent the upper surface 40 of the lower plate 22 would prevent the bolts 30 from being displaced with respect to the lower plate 22, and thereby assure that the anti-rotational engagement between the bolts 30 and the lower plate 22 is maintained, positioning of the washers 32 directly adjacent the upper side 40 of the lower plate 22 undesirably interferes with outward swinging of the bolts 30. As best seen in FIG. 5, the bolt head 36 can be raised up a small amount while still maintaining the lower plate projections 46 within their respective bolt head grooves 48.

Therefore, in order to both maintain the anti-rotational engagement between the bolts 30 and the lower plate 22, and still allow outward swinging of the bolts to their insertion position, the washers 32 are therefore disposed on the bolt shanks 34 at a position sufficiently spaced from the lower plate 22 to allow outward swinging of the bolts 30 with respect to the lower plate 22, yet sufficiently close to the lower plate 22 to prevent the bolts heads from being raised up and out of engagement with the projections 46 of lower plate 22. That is, the predetermined position of the washers 32 on their respective bolts is such that the washers 32 abut the lower plate to prevent disengagement of the anti-rotational engagement between the bolt heads 36 and the lower plate 22 and the washers 32 also only abut the lower plate after the bolts 30 have been swung completely outwardly at least as far as their insertion position.

Figure 8:
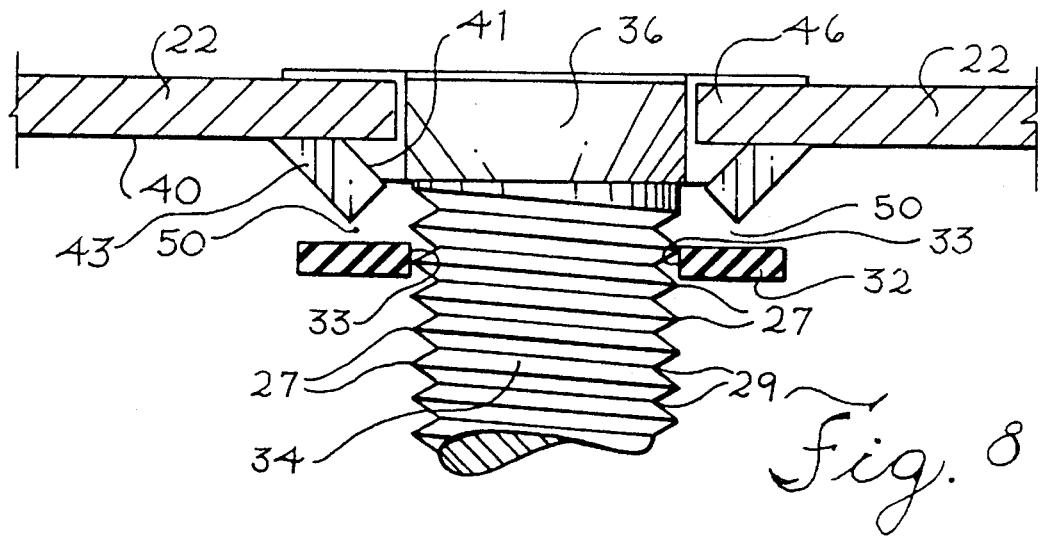
FIG. 8 is an enlarged, partial sectional view of the preassembled lower plate and bolt combination, illustrating the gap between washers and the lower plate and the tolerance fit of the washers on the bolt shanks.

In accordance with a still further aspect of the present invention, the washers 32 are disposed on their respective bolt shanks 34 by tolerance fit. The tolerance fit between the washers 32 and the shanks 34 of the bolts 30 is such that the washers 32 are displaceable under the pressure associated with upon clamping together the lower plate 22 and upper plate 42 about the belt ends 26 from their initial position in predetermined spaced relation from the lower plate 22 into abutment with the upper side 40 of the lower plate 22. As illustrated in FIG. 8, the shanks 34 of the bolts 30 have threads defined by crests 27 and roots 29. The inner diameter aperture surfaces 33 of the washers 32 are smaller in diameter than the diameter of the crests 27 of the shank threads, and the thread crests abrade the aperture surfaces 33 as the washers are forced to slide upwardly along the bolt shanks 34, under the clamping pressure, into abutment with the lower plate 22.

Additionally, the plastic washers 32 are preferably formed of a material which flows or deforms under the pressure associated with clamping together the upper and lower plates 42 and 22 about the belt ends 26. Thereby, the washers 32 deform under the clamping pressure and fill into the spaces between the bolts 30 and the lower plate 22.

With reference now to the cross-sectional views of FIGS. 3 and 4, there are spaces between the bolts 30 and the surfaces defining the apertures 24 in the lower plate 22. More particularly, in the illustrated embodiment, on the upper side 40 of the lower plate 22 there are spaces between the bolts 30 and the outer arcuate surfaces 43 on the upper side 40 of the lower plate 22. Upon application to the belt, the washers 32 first slide along the shanks 34 to eliminate the gaps 50. Under higher pressure when the nuts are tightened with a high torque, the plastic flows and extrudes and conforms to the contour of the upper side 40 of the lower plate 22 when forced against the lower plate. In the illustrated embodiment, the contour of the upper side 40 of the lower plate 22 is defined in part by arcuate surfaces 43. Thereby, the washers 32 deform to substantially fill the spaces between the bolts 30 and the surfaces 43 of the lower plate 22 defining the apertures 24 to substantially prevent the sifting of particulate. The washers 32 are also forced into the channels 37 to prevent sifting of particulate through the channels 37.

In practice, a pair of belt ends 26 to be connected are placed next to one another, with only a small gap between the belt ends (see FIG. 6). Holes 28 are punched in the belt ends, with the distance between centers of the holes 28 of opposing belt ends 28 being greater than the distance between the pair of apertures 24 of the lower plate 22. FIGS. 6 and 7 illustrate the lower plate 22 placed on top of the belt ends with the upper plate 42 on the bottom. Manifestly, the plates 22 and 42 can be readily switched with the lower plate 22 on the bottom of the belt ends and the upper plate 42 on the top without affecting the operation of the belt fastener herein. The preassembled combination of the lower plate 22 with bolts 30 extending through the lower plate apertures 24, and washers 32 disposed on the bolts 30 in predetermined spaced relation from the lower plate 22, has its bolts moved outwardly to their insertion position. The proximity of the washers 32 to the lower plate 22 assures that the anti-rotational engagement between the bolt heads 36 and the lower plate is maintained. The outwardly angled bolts 30 are inserted through respective holes 28 in the belt ends 26 while in their outwardly angled, insertion position, as shown in FIG. 6. Thereafter, the bolt shanks 34 are forced toward one another to the generally parallel, fastened position of FIG. 7, and the plate 42 is placed onto the ends 52 of the bolt shanks 34 which extend out through the bottom of the belt ends 26 to maintain the bolts in their fastened position.

The forcing together of the bolts 30 from their outwardly angled, insertion position of FIG. 6 to their generally parallel fastened position of FIG. 7 forces the belt ends 28 into tight abutment with one another, as shown in FIG. 7. The engagement of the plate 42 with the bolt shanks 34 maintains the bolts 30 in their substantially parallel, engaged position to maintain the belt ends 28 in tight abutment with one another. Finally, nuts 44 are screwed onto the bolt shanks 34 to maintain the plate 42 on the bolts 30 and to clamp the upper and lower plates 42 and 22 together about the belt ends 28. The upper and lower plates 42 and 22 have respective teeth 56 and 58 which dig into their respective upper and lower belt sides 60 and 62 upon clamping together of the plates about the belt ends 28.

The tightening of the nuts 44 to clamp together the upper and lower plates 42 and 22 about the belt ends displaces the washers 32 along their respective bolt shanks 34 into abutment with the upper side 40 of the lower plate 22. The clamping force deforms the washers and forces the washer material into the spaces between the bolts 30 and the lower plate 22 and into the channels 37 to fill the same.

The anti-rotational engagement of the bolt heads 36 with the lower plate 22 allows the nuts 44 to be tightened without the requirement of also gripping the bolt head while tightening the nuts to prevent rotation of the bolt together with the nut, as required with tightening of conventional nuts onto bolts.

The preferred criteria for the washers are that they are inexpensive, are non-brittle, are flowable or extrudable, and have a long shelf life over which the washers maintain their non-brittle and extrudable characteristics. Brittleness will cause the washers to crack or break apart when forced onto the bolts. Preferably, the plastic used can be used in fairly hot places without becoming too soft or losing its integrity, or in cold places without becoming too hard. The construction of the belt fastener of the present invention allows washers to be made of suitable inexpensive materials such as stamped out pieces of plastic. The preferred materials are elastomeric or plastic, polypropylene having been found to be a good choice.

By way of example, and not limitation, it was found that washers stamped from a 0.060 inch thick sheet of extruded polypropylene provided good characteristics. A washer having an outer diameter of 0.530 inch and inner diameter of 0.228 inch, with 0.060 inch thickness was found suitable for use with ¼ inch bolts; and a washer having an outer diameter of 0.530 inch and inner diameter of 0.291 inch, with 0.060 inch thickness was found suitable for use with 5/16 inch bolts. Gaps between the washers 32 and the upper surface 40 of the lower plate 22 in the range of between 0.030 inch and 0.050 inch have been found to provide good results, although manifestly the invention is not limited to this range, and a wide variety of gap and washer sizes and materials may be suitable for different applications.

Figure 9:
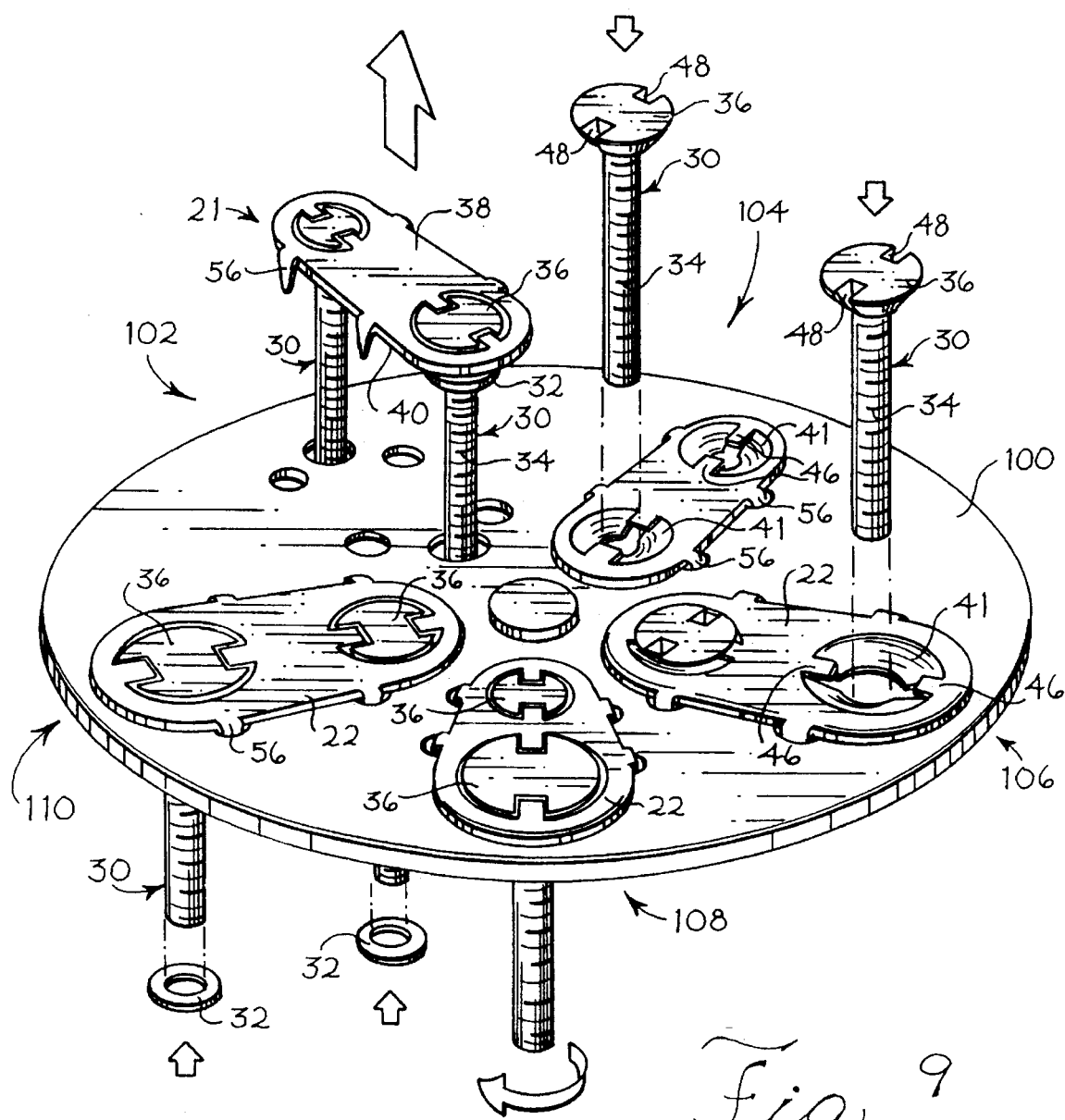
FIG. 9 is a schematic view of a method for forming the preassembled lower plate and bolt combination of the present invention.
Figure 10:
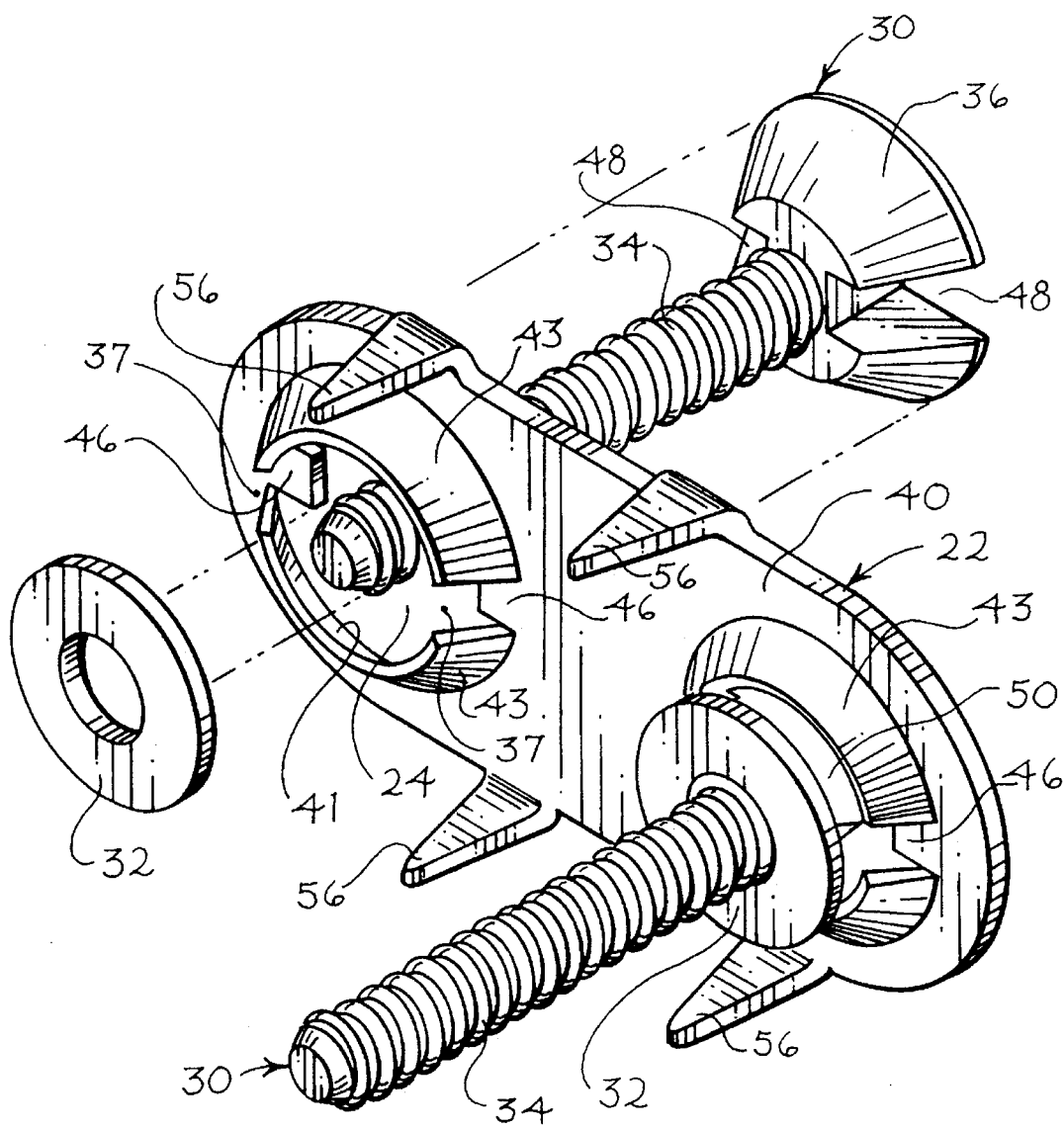
FIG. 10 is an enlarged, perspective view of the upper side of the preassembled lower plate and bolt combination of FIG. 1, showing the upper side of the lower plate and shown in partially exploded view.

The preferred method for forming the preassembled lower plate and bolt combination is represented in FIG. 9. A rotating turntable 100 is provided for supporting and conveying the lower plate through five radially spaced stations. As illustrated in FIG. 9 and described below, the turntable 100 supports five lower plates 22 in various stages of assembly with bolts 30 and washers 32.

The first station 102 is a loading and unloading station. A lower plate 22 is placed onto the turntable at the loading and unloading station 102 with the lower side 38 of the lower plate 22 residing against the turntable 100. (This is not illustrated in FIG. 9 which instead shows the finished assembly being removed at the first station. Both loading of lower plates onto the turntable, and removal of preassembled lower plate and bolt arrangements are carried out at the loading and unloading station 102.) Holes or recesses may be provided in the turntable 100 to accommodate the teeth of the lower plate 22.

Following loading of a lower plate 22 at the loading and unloading station 102, the turntable 100 is rotated to advance the lower plate 22 to a first bolt inserting station 104. There, a first bolt 30 is dropped down into a first lower plate aperture 24. The turntable is then rotated to advance the lower plate 22 and first bolt 30 to a second bolt inserting station 106. There, a second bolt 30 is dropped down into a second lower plate aperture 24.

When dropped down into the lower plate apertures 24, the bolts 30 may not be oriented properly, and the projections 46 of the lower plate 22 may not engage with the grooves 48 of the bolt heads 36. Hence, following loading of the second bolt 30 into its lower plate aperture 24, the lower plate and bolts are advanced to a bolt orienting station 108. There, the bolts are rotated about their respective axes to bring the grooves 48 of the bolt heads 36 into alignment to receive therein the projections 46 of the lower plate 22, whereupon the bolts are fully seated in the recesses 31 in the lower surface 38 of the lower plate 22.

Upon the next advancement of the turntable 100, the lower plate 22 and the pair of anti-rotationally engaged bolts 30 are advanced to a washer applying station 110. At the washer applying station 110, washers 32 are forced and slid upwardly along the shanks 34 of the bolts 30 while the bolts 30 are held down in anti-rotational engagement with the lower plate 22. The washers 32 have an aperture diameter smaller than the crest diameter of the threads, and hence the washers engage with the bolt shanks 34 by tolerance fit or force fit, and are forced over the threaded shanks 34 of the bolts to a predetermined position in spaced relation from the lower plate.

Finally, upon the next advancement of the turntable 100, the preassembled lower plate and bolt combination with washers 32 disposed on the bolt shanks 34 in predetermined spaced relation from the lower plate 22, is advanced to the loading and unloading station 102. There, the finished preassembly 21 is removed from the turntable 100 and another lower plate 22 loaded onto the turntable 100. Manifestly, a linearly moveable table may be employed to convey the lower plate to each of the plurality of linearly disposed stations, rather than the aforementioned rotary turntable.

While the washer 32 discussed above and illustrated in FIGS. 1–10 has been found to provide good results, it has been found that upon initial sliding the washer 32 onto the end 52 of the shank 34 of the bolt 30, the threads of the shank 34 may abrade the inner surface of the washer 32, with material abraded from the washer being lodged in the threads of the bolt shank, particularly in the threads adjacent its end 52. The abraded washer material may remain in the threads of the bolt shank, and interfere with proper subsequent screwing of the nut 44 onto the threaded bolt shank. That is, as discussed above, the washer 32 is proportioned for tolerance fit engagement with the bolt shank 34, whereby the inner surface of the washer 32 presses against the crests of the threads of the bolt shank as the washer is slid onto the shank, resulting in the inner portion of the washer being scraped by the bolt shank and the scrapings from the washer becoming lodged in the threads of the bolt shank. The plastic of the washer lodged in the bolt threads may interfere with the subsequent screwing of the bolts onto the threaded bolt shank which, as discussed above, is carried out during clamping together of the upper and lower plates about the belt. It is desired that the plastic washer not extrude onto the threads of the bolt when initially applied thereto, yet deform or extrude to fill gaps when the nuts are tightened on the bolts to tightly affix the fastener to the belt ends.

To overcome the problem of a portion of the washer material being scraped off by the threads of the bolt shank as the washer is slid onto the bolt shank, so as to prevent the washer material from remaining in the threads of the bolt shank during engagement of the nut onto the bolt, the washer 132 illustrated in FIGS. 11–14 is preferably employed. The preferred washer 132 has a plurality of radially inwardly extending tabs 133 which are resiliently deflectable from the preloaded position of FIG. 13 to the loaded position of FIG. 11 upon slidable receipt of a bolt shank 134 through the washer.

Figure 13:
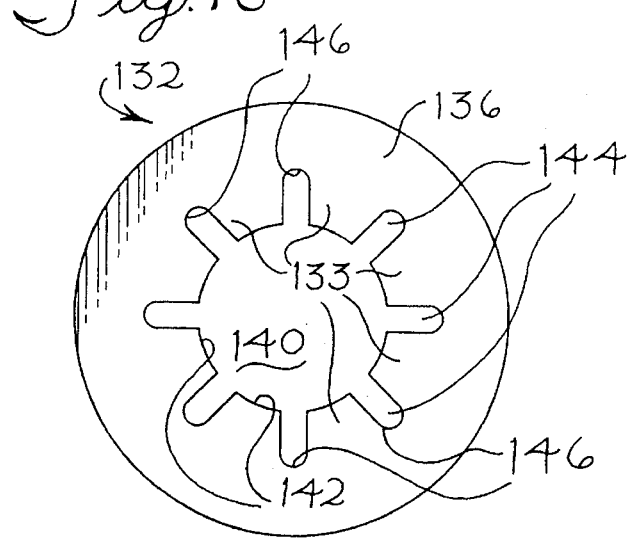
FIG. 13 is an enlarged plan view of the preferred washer of FIG. 11.
Figure 14:
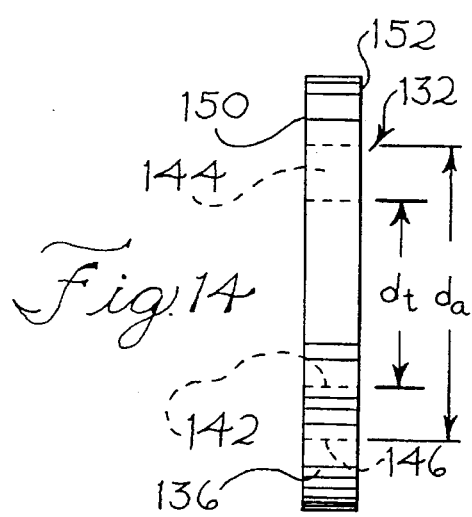
FIG. 14 is a side elevational view of the washer of FIG. 13.

As best shown in FIGS. 13 and 14, the washer 132 has an outer annular ring portion 136 which defines a central aperture 140 of diameter $d_a$. A plurality of integral, resilient tabs 133 extend radially inwardly from the outer annular ring portion 136 into the central aperture 140. The tabs 133 have inner ends 142 which are preferably arcuate, with the inner ends 142 together defining a tab diameter $d_t$. The tabs 133 are separated from one another by slots 144 disposed between adjacent tabs 133. The slots 144 extend radially outwardly from the tab diameter $d_t$ at the inner ends 142 of the tabs 133 to the annular ring diameter $d_a$ at which the radially outward ends 146 of the slots 144 are arcuate.

Figure 12:
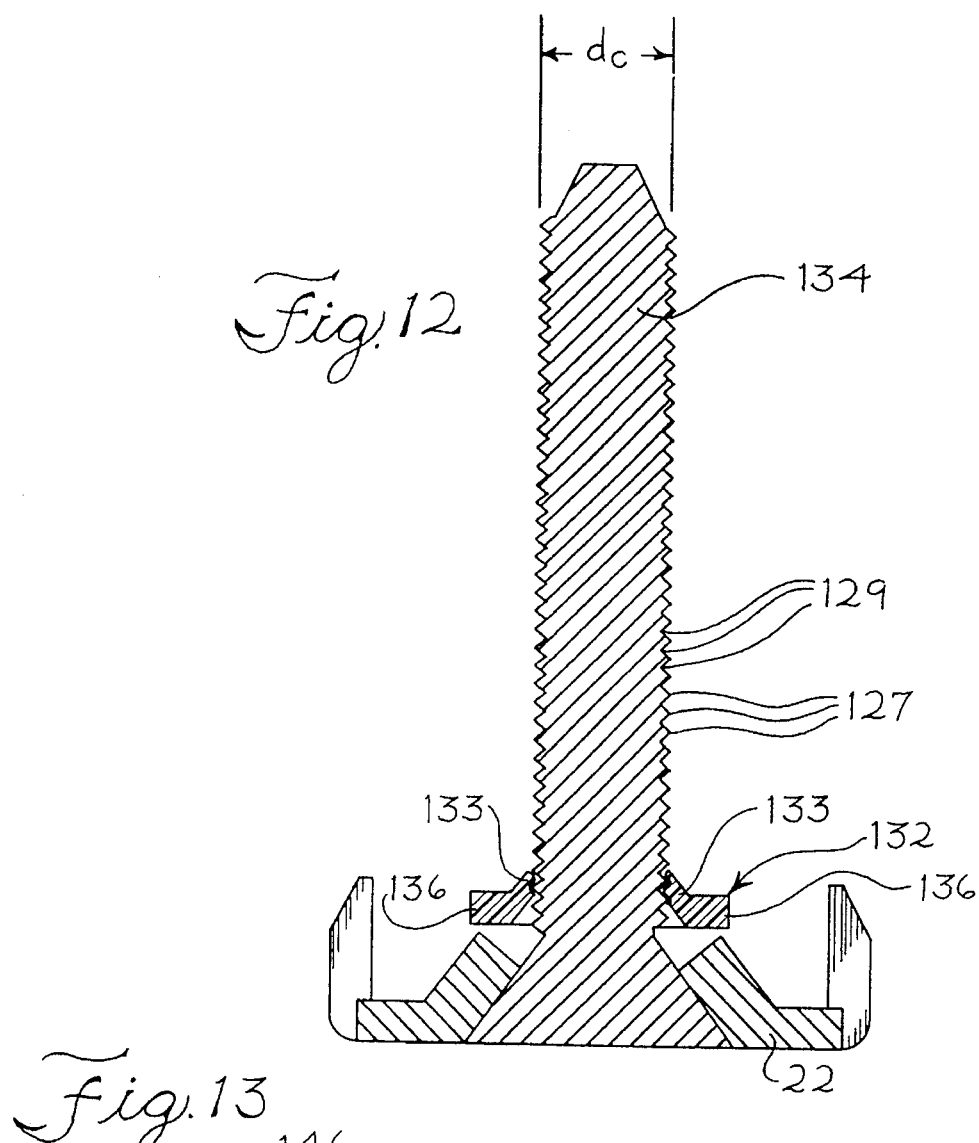
FIG. 12 is a sectional view of the lower plate and bolt combination of FIG. 11, illustrating the preferred washer in section.

The bolt shank 134 is threaded, with the threads of the bolt shank 134 defining a plurality of crests 127 and roots 129. The crests 127 of the threaded bolt shank 134 define a crest diameter $d_c$, as shown in FIG. 12. The crest diameter $d_c$ of the bolt shank 134 is greater than the tab diameter $d_t$ at the inner ends 142 of the washer tabs 133 and less than the annular ring diameter $d_a$ at the outer ends 146 of the slots 144 of the washer 132. The slots 144 separate the tabs 133 from one another and allow the tabs 133 to be resiliently deflected independently of one another.

Figure 11:
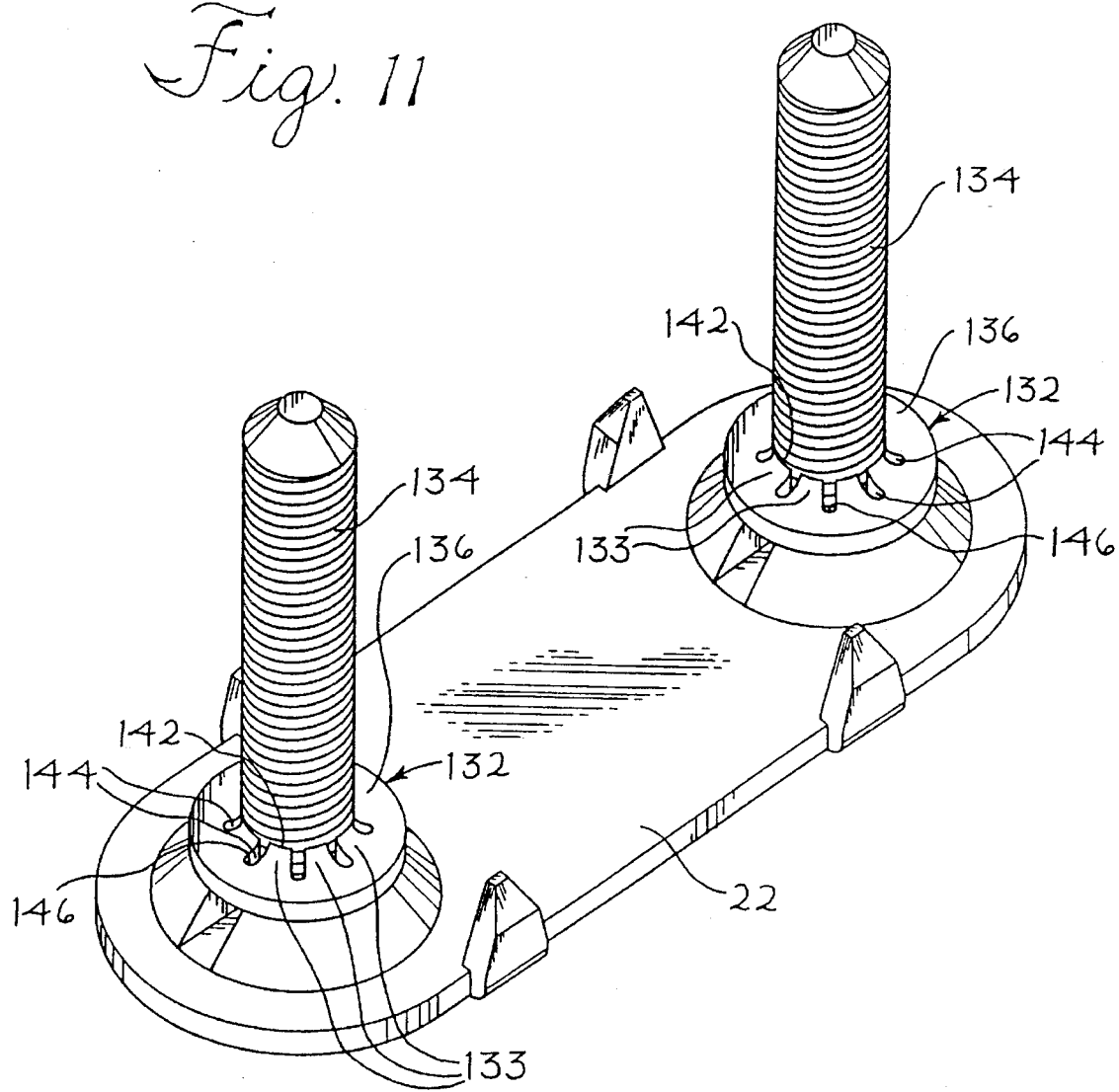
FIG. 11 is a perspective view of an alternative embodiment preassembled lower plate and bolt combination, showing the preferred washer applied to bolts.

Since the crest diameter $d_c$ of the bolt shank 134 is greater than the tab diameter $d_t$ of the washer 132, upon insertion of the bolt shank 134 through the central aperture 140 of the washer 132, the inner ends 142 of each of the tabs 133 are simultaneously resiliently deflected outwardly by the crests 127 of the bolt shank threads as the bolt shank is passed through the central aperture 140 of the washer 132. That is, the bolt shank 134 deflects the inner ends 142 of the tabs 133 to a position between the tab diameter $d_t$ and the annular ring diameter $d_a$. The washer 132 may be slid over the crests of the bolt shank to a desired position along the bolt shank 134, preferably to a position near the lower plate 22 as discussed above to maintain anti-rotational engagement of the bolt with the lower plate 22 and to allow outward swinging of the bolts. After the washer 32 has been slid to its desired position along the bolt shank 134, the inner ends 142 of the tabs 133 continue to exert an inward force on the bolt shank 134 to secure the washer 132 in the desired stationary position as illustrated in FIGS. 11 and 12.

The resilient deflection of the tabs 133 prevents the inner ends 142 of the tabs 133 from being scraped off by the threads of the bolt shank 134 during sliding of the washers 132 onto the bolt shank so that washer material is not scraped into the roots 129 of the bolt shank 134, while also providing secure engagement of the washer 132 to the bolt shank 134 at a desired position therealong.

The washer 132 is generally flat in its initial, preloaded state, with the tabs 133 being flat and substantially planar and disposed in the plane of the annular portion 136. The symmetry of the washer 132 allows either the upper side 150 or the lower side 152 of the washer 132 to be placed onto the bolt shank 134 first, so that during assembly the operator need not be concerned with the orientation of the washers. Once the washer 132 is slid onto the bolt shank 134, however, and the tabs 133 deflected, the washer 132 may then only be advanced further along the bolt shank 134 in a direction opposite to the direction in which the tabs 133 are deflected. For instance, with reference to the washer 132 and bolt shank 134 of FIG. 12, the tabs 133 are deflected upwardly and extend at an angle, with the inner tab ends 142 bearing against the bolt shank 134. Movement of the washer 132 further downwardly would be relatively easy since the tabs 133 would be deflected outwardly by the bolt shank as the washer 132 is slid downwardly. However, movement of the washer 132 upwardly along the bolt shank 134 encounters considerably greater resistance. In attempting to move the washer 132 upwardly, the ends 142 of the tabs 133 engage with the crests 127 of the bolt shank 134 to resist movement of the washer 132 in the upper direction. With the tabs 133 extending inwardly at an angle and the inner ends 142 of the tabs 133 bearing against the crests 127 of the threads of the bolt shank 134, the engagement of the ends 142 of the tabs 133 with the bolt shank threads prevents upward sliding of the washer 132 along the bolt shank 134. That is, upward force on the washer 132 results in a corresponding greater inward force of the inner ends 142 of the tabs 133 against the bolt shank 134, thereby further preventing upward sliding of the washer 132 along the bolt shank 134. Hence, after the washer 132 has been slid in a first direction along the bolt shank 134 to a desired position therealong, the resilient tabs 133 resist sliding of the washer 132 back along the bolt shank 134 in an opposite direction. Therefore, the resilient deflectable tabs 133 of the washer 132 secure the washer 132 in a desired stationary position on the bolt shank 134, and are well suited for securing closely adjacent the lower plate 22 as discussed above.

As with the washer 32 discussed above, the washer 132 is preferably made of a material which is deformable or extrudable under the pressure associated with clamping together of the upper and lower plates about the belt to substantially fill in the spaces between the bolts and the surfaces defining their respective lower plate apertures. The tab arrangement provides sufficient material for filling in the spaces between the bolts and the surfaces defining their respective lower plate apertures, while still allowing the washers 132 to be slid onto their bolt shanks 134 without the washer material being scraped into the bolt threads during sliding of the washers to their desired position.

By way of illustrative example, it was found that good results were obtained for a 0.312 inch diameter bolt shank with a circular washer 132 formed of polypropylene and having an outer diameter of approximately 0.530 inch, a tab diameter $d_t$ of approximately 0.220 inch, and an annular diameter $d_a$ of approximately 0.348 inch, with the washer having eight equally spaced tabs 133 separated by slots 144 of 0.031 inch width. The washers 132 lend themselves to inexpensive production such as by stamping. Manifestly, the shapes of the tabs 133, the materials used, and the dimensions recited herein may be changed from that given for the described preferred embodiment of the invention.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. In a plate fastener having a lower plate with surfaces defining apertures tot use with a belt, the combination comprising:

a pair of bolts disposed within the apertures of the lower plate, the bolts each having a bolt head and a shank portion with threads defining a plurality of roots and crests, the shank portion having a predetermined crest diameter at its crests, and there being a space between each bolt and the surface defining each aperture in the lower plate; and a washer on each shank portion formed from a plastic material and each comprising an outer annular ring portion defining a central annular ring aperture of diameter greater than said predetermined crest diameter of the bolt shank, with the washers each having a plurality of integral, resilient plastic tabs with inner ends which together define a tab diameter less than said predetermined crest diameter, with the tabs resiliently deflected by the bolt shank received through the washer from a preloaded position in which the tabs extend radially inwardly into the annular ring aperture in substantially the plane of the annular ring portion, to a loaded position in which the tabs are deflected outwardly by the bolt shank to extend at an angle to the plane of the annular ring portion with the inner ends of the tabs engaging the crests of the bolt shank to secure the washers in a stationary position on the bolts, the resilient deflection of the tabs preventing the abrading of the plastic washer material by the bolts during sliding of the washers onto the bolts, in which each washer is deformable so as to extrude under pressure associated with clamping the lower plate against the belt to substantially fill in the space between each bolt and said surface defining the lower plate apertures.

2. A plate fastener in accordance with claim 1 wherein the plastic washers are mounted on the bolt shanks spaced from ends of the shanks at a predetermined axial position along their respective axes of rotation to allow the shanks to be moved while substantially maintaining the bolt heads in the apertures in engagement with anti-rotation means, the shanks being movable in both a substantially perpendicular direction relative to the lower plate and a pivoting angular path relative to the lower plate with movement in the angular path allowing the other ends of the shanks to be spaced from each other at a first distance and at a second distance which is greater than said first distance.

* * * * *

UNITED STATES PATENT AND TRADEMARK OFFICE
CERTIFICATE OF CORRECTION

PATENT NO. : 5,599,131
DATED : February 4, 1997
INVENTOR(S) : Julen, et al.

It is certified that error appears in the above-indentified patent and that said Letters Patent is hereby corrected as shown below:

IN THE CLAIMS:

Column 10, line 53, change "tot" to --for--.

Signed and Sealed this

Twenty-second Day of July, 1997

Attest:

BRUCE LEHMAN

*Attesting Officer*    *Commissioner of Patents and Trademarks*